United States Patent
Glaze et al.

[15] 3,692,260
[45] Sept. 19, 1972

[54] DAMPING DEVICES

[72] Inventors: Stanley George Glaze, Kingswinford; Charles Philip Smith; Jerzy Leon Courtenay, both of Wolverhampton, all of England

[73] Assignee: H. M. Hobson Limited, London, England

[22] Filed: May 28, 1970

[21] Appl. No.: 41,441

[52] U.S. Cl. ..........................244/78, 92/9, 244/85
[51] Int. Cl. ..............................................B64c 13/40
[58] Field of Search......244/78, 75 R, 76 R, 83 R, 85, 244/76 B, 76 C, 75 A; 91/411 R, 411 A; 92/8, 9, 85, 143; 188/316–318

[56] References Cited

UNITED STATES PATENTS 2,623,502  12/1952  Lisle ..........................92/8 X

FOREIGN PATENTS OR APPLICATIONS 873,644  7/1961  Great Britain...............244/78

Primary Examiner—Milton Buchler
Assistant Examiner—F. K. Yee
Attorney—E. T. LeGates

[57] ABSTRACT

A hydraulic jack for actuating the flying control surface of an aircraft which includes a damper mechanically connected to the piston and cylinder assembly of the jack and effective to augment the stability of the installation.

4 Claims, 2 Drawing Figures

PATENTED SEP 19 1972

3,692,260

DAMPING DEVICES

This invention is concerned with hydraulic jacks for actuating the flying control surfaces of aircraft. Such actuators include a piston and cylinder assembly, one of which is fixed and the other of which constitutes the output member for actuating the control surface, and a control valve which is movable from a neutral position under control of the pilot to connect one end of the cylinder to a pressure inlet and the other end of the cylinder to exhaust, so effecting relative movement of the piston and cylinder.

When the piston is fixed and the cylinder movable, automatic feedback is obtained since the cylinder moves in the direction to cause return of the control valve to its neutral position with respect to the ports which it controls. In the alternative case, when the cylinder is fixed, some form of mechanical or electrical feedback is normally provided between the output member and the control valve.

When a hydraulic jack is utilized to operate an aircraft control surface resonant, i.e. underdamped, behavior and continuous oscillation can occur due to coupling between the deflections of the jack and/or structure and the power input controlled by the movements of the control valve of the jack. Instability can occur whether the piston has zero or a finite velocity with respect to the cylinder and the worse situation occurs when the control valve is nearly closed, as damping is then at a minimum. Any such tendency can be controlled satisfactorily in certain circumstances by suitable damping. Thus it has been proposed to apply dampers between the control surface and the aircraft structure and to place a hole in the jack piston to induce energy loss during vibration.

It is characteristic of resonance in these known devices that the limit of growth of an unstable oscillation is usually reached as the pressure in the jack chambers peaks at supply pressure or thereabouts, and that this state of affairs commonly occurs whilst the self induced valve opening is relatively small. Thus the energy lost in valve flow modulation per cycle is small and is not very effective in stabilizing the installation. It should be noted for example that no energy can be lost in driving oil through a closed valve, and a correspondingly small amount of energy will be absorbed at small valve openings.

The invention provides a hydraulic jack for actuating an aircraft flying control surface, which includes a damper mechanically connected to the piston and cylinder assembly of the jack and effective to augment the stability of the installation. Preferably a damping orifice is incorporated within the rod of the jack piston. This may frequently be done without increase in diameter of the piston rod, particularly when the internal bore of the piston rod is directly connected to the power source or to the exhaust line.

In a jack in accordance with the invention a force is provided between the moving and fixed parts, in a direction opposing the motion, which is a function of velocity and is proportional to the square of the velocity if simple orifices are used. This force is a damping force and since the orifices dissipate energy upon relative movement between the piston and cylinder whether the control valve is open or closed they are preferable to damping orifices provided in the lines between the control valve and the cylinder.

Other objects, features and advantages of the invention will appear from the following detailed description, taken in conjunction with the attached drawings in which.

Figure 1:
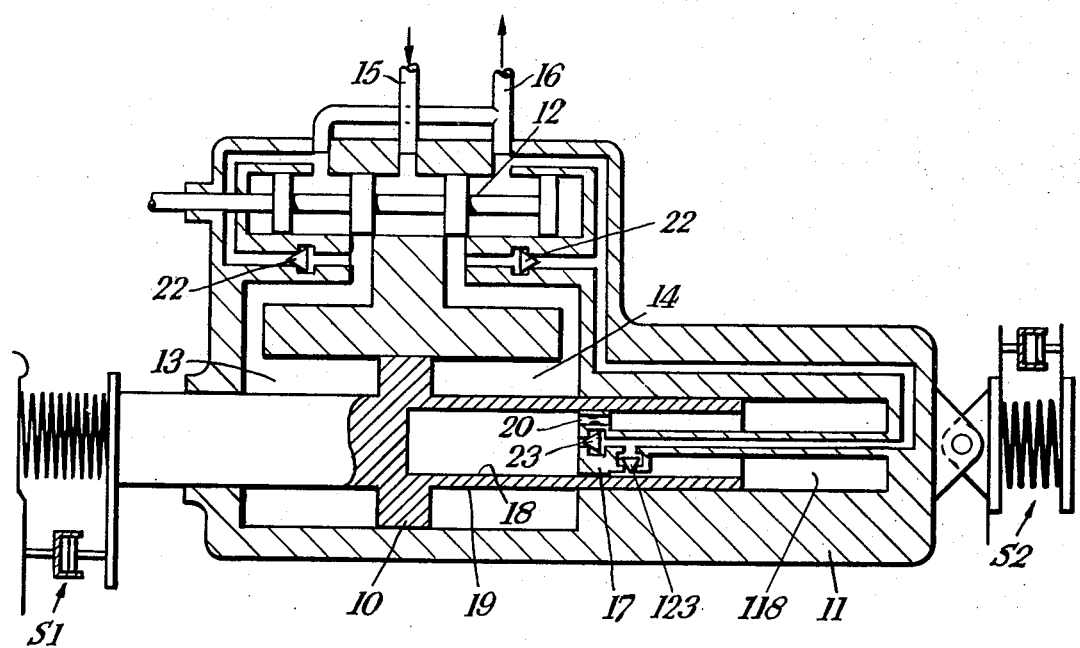
FIG. 1 is a diagrammatic drawing of one embodiment of the invention.
Figure 2:
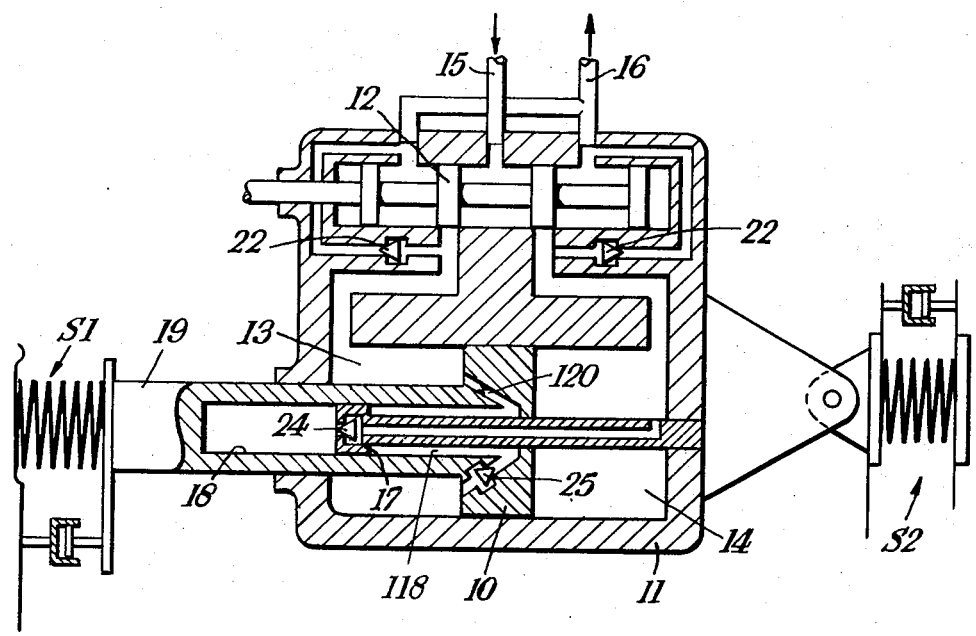
FIG. 2 is a diagrammatic drawing of a second embodiment of the invention.

In each of the embodiments of FIGS. 1 and 2, the jack includes a fixed piston 10, a movable cylinder 11 connected to a flying control surface not shown and a control valve 12 which controls connections between opposite ends 13 and 14 of the cylinder and a pressure inlet 15 and an exhaust outlet 16. $S_1$ and $S_2$ indicate the structural compliances, represented notionally by a spring and a dashpot in parallel with it, between the piston 10 and the aircraft structure and between the cylinder 11 and the control surface. A smaller piston 17, attached to the cylinder 11, is slidable in a bore 18 in the piston rod 19.

In the case of the symmetrical jack shown in FIG. 1, damping occurs within the bore 18 for both directions of movement due to a damping orifice 20 in the piston 17. Non-return valves 22 are provided which permit oil to be drawn from exhaust if the pressure in either end 13 or 14 of the cylinder should fall below exhaust pressure so that cavitation cannot occur. Non-return valves 23 and 123 are provided in parallel with the damping orifice 20. Without the valves 23, the orifice 20 may prevent development of the required maximum velocity. A compromise between the requirements of stability of control and maximum velocity is effected by by-passing the damping orifice 20 by the valves 23 which are set to relieve at an appropriately high pressure.

In the case of the differential area jack shown in FIG. 2, a damping orifice 120 is provided in the piston 10. Non-return valves 22 are again provided in the exhaust lines and further non-return valves 24 and 25 are respectively provided in the piston 17 and in the piston 10.

In both of the constructions illustrated movement of the control valve 12 to the left from the neutral position shown will connect the space 13 to pressure and the space 14 to exhaust causing the cylinder 11 and the piston 17 to move to the left with respect to the fixed piston 10. In the case of FIG. 1, this will cause liquid to flow from the space 18 to exhaust through the damping orifice 20 and the non-return valve 123 and the other non-return valve 23 can open if necessary to provide a bypass flow to exhaust. In the case of FIG. 2, there will be no damping because the non-return valve 24 will open to provide a direct flow to exhaust from the space 18.

Upon movement of the control valve 12 to the right from its neutral position, the space 13 will be connected to exhaust and the space 12 to pressure in both constructions, causing the cylinder 11 and the piston 17 to move to the right with respect to the fixed piston 10. In the case of FIG. 1, liquid will be transferred from the space 118 to the space 18 through the damping orifice 20. In the case, however, of FIG. 2, liquid from the space 118 will be expelled to exhaust through the damping orifice 120 and the non-return valve 25 can open if necessary to provide a bypass flow to exhaust.

The advantages of the above described arrangements are:

1. That variable stability control may be effected by changing the sizes of the damping orifices, which is much easier than by variation of structural distortion feedback.

2. The introduction of a damper within the piston rod provides an economic means of saving space in an aircraft installation.

3. The use of a damper pressurized from the main chamber pressures enables a double acting, double ended camper to be easily primed at a pressure high enough to inhibit cavitation in many instances.

What we claim as our invention and desire to secure by Letters Patent is:

1. A hydraulic jack for actuating a flying control surface of an air craft which comprises a cylinder and cooperating main piston, one for attachment to the aircraft structure and the other for attachment to the control surface, a control valve external to the cylinder and movable in opposite directions from a neutral position to connect opposite ends of the cylinder alternatively to a pressure inlet and to an exhaust outlet and thereby to effect relative movement between the cylinder and the main piston, a smaller piston attached to the cylinder and extending into a bore in the piston rod of the main piston, a damping orifice in one of the main piston and the smaller piston for controlling the flow of liquid between said bore and the exhaust outlet, and a non-return valve in the said one of the main piston and the smaller piston adapted to open to provide a bypass flow from the bore to the exhaust outlet.

2. A hydraulic jack as claimed in claim 1, wherein said non-return valve is in the smaller piston.

3. A hydraulic jack as claimed in claim 1, wherein said non-return valve is in the main piston.

4. A hydraulic jack as claimed in claim 1, which includes exhaust outlet valves between opposite ends of the cylinder and the exhaust outlet which permit of fluid being drawn from exhaust without cavitation.

* * * * *